Aug. 31, 1926.

H. L. BROWNBACK 1,598,046

INTAKE MANIFOLD FOR INTERNAL COMBUSTION ENGINES

Filed April 8, 1924   2 Sheets-Sheet 1

Inventor

Henry L. Brownback
by Alexander & Dowell
Attorneys

Aug. 31, 1926.
H. L. BROWNBACK
INTAKE MANIFOLD FOR INTERNAL COMBUSTION ENGINES
Filed April 8, 1924   2 Sheets-Sheet 2
1,598,046
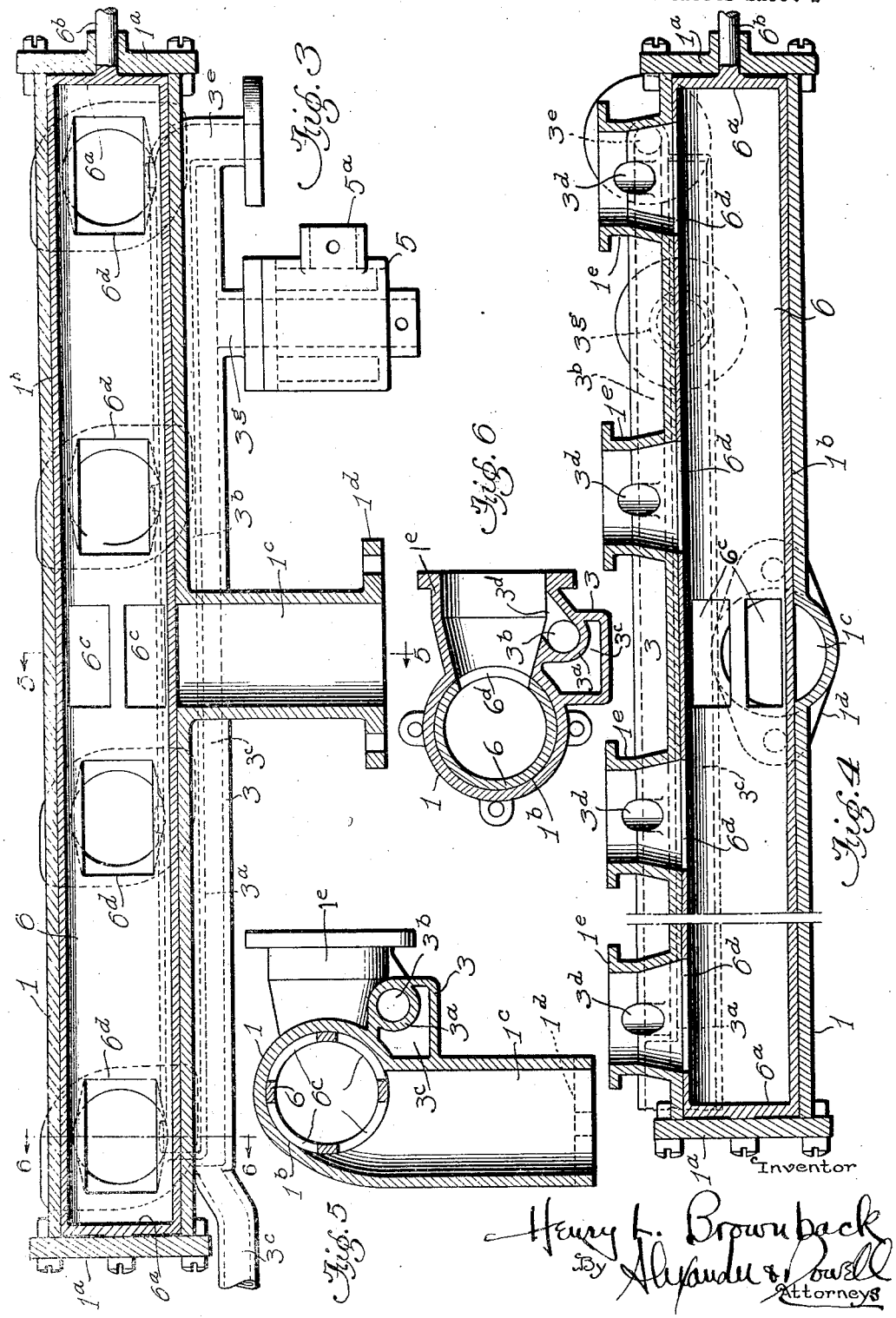

Patented Aug. 31, 1926.

1,598,046

UNITED STATES PATENT OFFICE.

HENRY LOWE BROWNBACK, OF NORRISTOWN, PENNSYLVANIA.

INTAKE MANIFOLD FOR INTERNAL-COMBUSTION ENGINES.

Application filed April 8, 1924. Serial No. 705,025.

This invention is a novel intake manifold for internal combustion engines having a single intake valve and exhaust valve for each cylinder or working chamber, and the principal object of the invention is to provide a novel intake manifold, having two fuel ducts supplied by separate carburetors, said ducts being so shaped and proportioned as to give maximum efficient gas speeds for all engine speeds, and a plurality of separate and distinct efficiency ranges and peaks as the speed of the engine increases from zero to maximum.

Another object of the invention is to provide a novel intake manifold, having a duct for the fuel gases passing into the working cylinder at high engine speeds, and a separate duct for the fuel gases at low engine speeds, said ducts being supplied by separate carburetors; also a duct therein for the exhaust gases disposed adjacent the low speed gas duct and adapted to heat same and the gases therein and thus prevent condensation of the gases in the low speed passage.

A still further object is to provide a valve in the high speed fuel gas duct disposed adjacent the intake ports of the engine said valve serving also as the throttle for the high speed carburetor so that when the engine is aspirating through the low speed fuel passage, the gases in the high speed fuel passage will be prevented from becoming rarified, and also to prevent pulsation due to fuel gases being forced back through the said valve in the high speed duct and compressing the column of gas in the high speed duct.

Other minor objects of the invention will be hereinafter set forth.

I will explain the invention with reference to the accompanying drawings which illustrate one practical embodiment thereof to enable others to adopt and use the same, and will summarize in the claims, the novel features of construction, and novel combinations of parts, for which protection is desired.

In the drawings:

Fig. 3 is an enlarged vertical longitudinal section through the manifold, detached.

Fig. 4 is an enlarged horizontal longitudinal section through the manifold.

Fig. 5 is a transverse section on the line 5—5, Fig. 3.

Fig. 6 is a transverse section on the line 6—6, Fig. 3.

Figure 1:
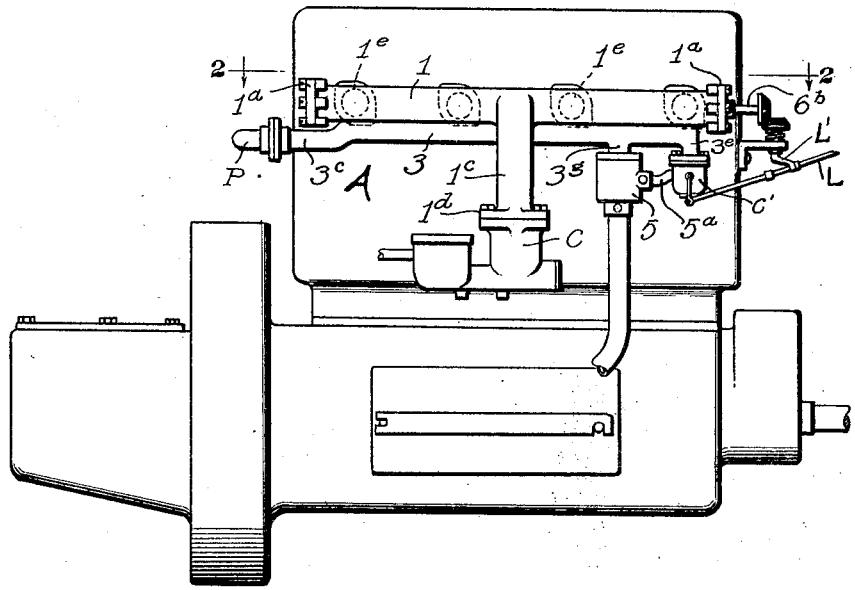
Fig. 1 is a side elevation of a conventional 4-cylinder internal combustion engine equipped with my novel manifold.
Figure 2:
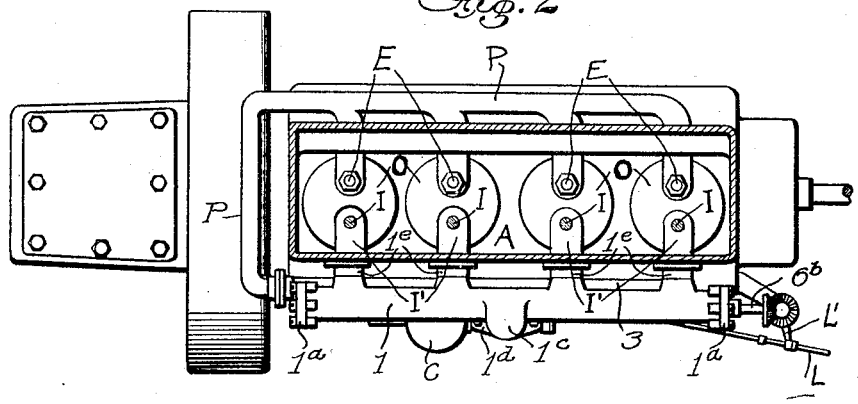
Fig. 2 is a section therethrough on the line 2—2, Fig. 1.

As shown in Figs. 1 and 2, the engine shown in the drawings is shown as a conventional 4-cylinder internal combustion engine, having four cylinders O, disposed in the engine casting A, each cylinder being provided with an intake valve I, with a passage I' leading to the exterior of the engine casing; also an exhaust valve E is provided for each cylinder, with ports leading to the exhaust pipe P as shown in Figs. 1 and 2. However any type of internal combustion engine may be used, and the number of cylinders or units is not material to the invention and may be varied at will.

In the drawings, the manifold comprises a cylindrical body portion 1, of substantially the same length as the engine casing upon which the manifold is to be used, said body portion 1 being closed at each end preferably by detachable end plates 1ª, which may be bolted, or secured in any other desired manner, to the body portion. The bore 1ᵇ of the body portion 1 is preferably cylindrical, and extends the full length of said body portion.

Communicating with bore 1ᵇ is a tubular inlet extension 1ᶜ, depending from the body portion 1, preferably adjacent its mid-point, the lower end of extension 1ᶜ being preferably flanged as at 1ᵈ, and provided with bolt holes in the usual manner, for the reception of bolts for attaching the main carburetor C thereto.

From the rear of body portion 1 extend a plurality of tubular feeder extensions 1ᵉ, communicating with bore 1ᵇ (four such extensions being shown) and adapted to register respectively with the intake ducts I' in the engine casing leading to the intake valves I thereof.

Integral with body portion 1, exterior thereto, and disposed preferably below the tubular feeder extensions 1ᵉ, is a housing 3, preferably substantially rectangular in cross-section, as shown in Figs. 5 and 6, and preferably extending the full length of the body portion 1. The interior of the housing 3 is divided longitudinally by a substantially semi-circular wall 3ª, into a cylindrical duct $3^b$ of relatively small diameter, and adapted for the passage of the low speed fuel vapors therethrough when the engine is running at low speeds, said bore $3^b$ being disposed preferably at the outer upper corner of housing 3. The remaining portion of housing 3 forms a duct $3^c$ adapted for the passage therethrough of the exhaust gases from the cylinders or working chambers of the engine.

Duct $3^b$ communicates with the interior of each feeder extension $1^e$ by means of passages $3^d$, (Fig. 6) extending upwardly and rearwardly through the walls of extensions $1^e$, at points intermediate the bore $1^b$ and the outer ends of said feeder extensions $1^e$.

At one end of bore $3^b$ is a tubular inlet extension $3^e$ communicating with said bore, and depending from the housing 3, and extension $3^e$ is adapted to be connected with an auxiliary carburetor $C'$ for the purpose of supplying fuel gases or vapors thereto when the engine is running at low speeds, as hereinafter explained.

The exhaust gases from the exhaust valves E of the engine are conducted by pipe P into the exhaust duct $3^c$ of the manifold, said pipe P being preferably coupled to a flanged extension of the duct $3^c$ (as shown in Fig. 1) at the end of the manifold opposite the inlet extension $3^e$. At the other end of exhaust duct $3^c$ is a tubular outlet extension $3^g$, communicating with said duct, and depending from the housing 3, adjacent the extension $3^e$.

The exhaust gases pass through duct $3^c$, and out through tubular outlet extension $3^g$, from whence the exhaust gases may be conducted into a suitable muffler, (not shown) or discharged into the atmosphere. The exhaust gases in duct $3^c$ heat the walls of gas duct $3^b$ and the fuel gas therein, and prevent condensation of the fuel gases in duct $3^b$, and the travel of the exhaust gases in duct $3^c$ is in a direction opposite to the travel of the fuel gases in duct $3^b$.

Around the outlet extension $3^g$ is provided an air heater 5 of any desired or suitable type, having a passage or pipe $5^a$ leading therefrom to the air inlet port of the auxiliary carburetor $C'$ for the purpose of supplying heated air to said auxiliary carburetor (Fig. 1).

Within the bore $1^b$ is a rotary valve or sleeve comprising a tube 6, making a close fit in the bore $1^b$, and extending the full length thereof, said tube 6 being closed at each end as at $6^a$. Attached to one end of the tube 6 is a shaft $6^b$ extending through the adjacent end plate $1^a$ of the body 1, said shaft $6^b$ having suitable means connected thereto for oscillating the sleeve 6 within the bore $1^b$ as hereinafter described.

In the tube 6, opposite the inlet extension $1^e$ is a plurality of circumferentially disposed openings or holes $6^c$ adapted to allow the fuel vapors from the main carburetor C to pass into the interior of the tube 6 for any position of tube 6 with respect to bore $1^b$. Also, in the tube 6, opposite each of the feeder extensions $1^e$ is a port or opening $6^d$ for the purpose of permitting fuel vapors to pass from the interior of tube 6 into said feeder extensions $1^e$ and hence into the intake ports I when the tube 6 is oscillated into the proper registering position, all the openings $6^d$ being aligned and registering simultaneously with the feeder extensions $1^e$.

As shown the low speed gas duct $3^b$ is approximately only one-fourth as large in diameter as the main fuel gas bore $1^b$, the duct $3^b$ being adapted to supply fuel gas to the working chambers O independently of the main gas duct $1^b$ when the engine is running at low speeds, and the duct $1^b$ augmenting duct $3^b$ and supplying fuel gas to the working cylinders O when the engine is running at high speeds. The exhaust gases from the working chambers are directed through duct $3^d$ in a direction opposite to the flow of gases in bore $3^b$, so as to heat the fuel gases passing through said duct $3^b$ to the working chambers.

The main carburetor C preferably has no throttle located at the carburetor, the tube or sleeve 6 serving as the throttle for said main carburetor; but the auxiliary carburetor $C'$ is provided with the usual throttle located at the said carburetor, as shown in Fig. 1, which throttle may be controlled by the usual link L, or other mechanism, for operating the said throttle of carburetor $C'$. Slidably embracing the link mechanism L is a member $L'$ adapted to rotate or oscillate the tube or sleeve 6 in the bore $1^b$, to bring the ports $6^d$ therein into register with the feeders $1^e$, at a predetermined engine speed or after the throttle of the auxiliary carburetor $C'$ has been opened to its full extent, and the maximum efficiency of the engine operating through said auxiliary carburetor $C'$ has been attained. Any desired means may be provided for so operating the sleeve 6, and as shown in Figs. 1 and 2, link $L'$ is rigidly connected to a vertically disposed shaft housed in suitable brackets mounted on the engine casing, said shaft having a bevel gear thereon meshing with a bevel gear on the sleeve shaft $6^b$. A spring around the vertically disposed shaft tends to keep the sleeve in normally closed position. On the link L are stops on both sides of link $L'$, and the above mentioned spring tends to keep the link $L'$ into engagement with the outermost stop. When however link L is moved to open the auxiliary carburetor throttle, the inner stop will engage the link $L'$ and rotate the sleeve 6. The inner stop may be adjusted so that the sleeve 6 will not be rotated until the throttle has been opened its full extent.

In operation, when the engine is running idle, or is throttled to very low speeds, the ports 6$^d$ in the tube 6 will not register with the feeders 1$^e$, since the link L' is not engaged with the inner stop on link L. A small amount of fuel vapors will be supplied by the auxiliary carburetor C' through the duct 3$^b$, which duct 3$^b$ and the gases or fuel vapors therein are kept heated by means of the exhaust gases which are passed through the duct 3$^c$ in the opposite direction to the travel of the gas in duct 3$^b$, also by means of the stove 6 which supplies heated air to the auxiliary carburetor C'. The small diameter of duct 3$^b$ allows a high gas speed to be maintained in duct 3$^b$ at low engine speeds, thereby eliminating condensation, poor distribution and other undesirable features attendant with low gas speeds in manifolds of large diameter.

As the link L is operated to open the throttle of auxiliary carburetor C' to its full extent, or when the engine is operating with maximum efficiency and speed through said carburetor C' and duct 3$^b$, further operation of the link L will cause the inner stop to engage link L' and rock the tube 6 in the bore 1$^b$ to bring the ports 6$^d$ therein into register with the feeders 1$^e$, whereby gas from the main carburetor C will be supplied to the said feeders 1$^e$, from the main carburetor C, in addition to the supply of fuel gases from the auxiliary carburetor C'. Upon further operation of the link L the tube 6 will be rotated until the maximum opening between the ports 6$^d$ and feeders 1$^e$ is obtained.

By the above arrangement, the maximum efficient gas speeds at or for all engine speeds is obtained and two separate and distinct efficiency ranges or peaks are obtained, one for the engine when operating solely through the low speed duct 3$^b$ and auxiliary carburetor C', and the other when operating through both the low speed duct 3$^b$ and auxiliary carburetor C'; and the high speed duct 1$^b$, and main carburetor C.

As above stated, the main carburetor C has no throttle disposed at the carburetor itself, the tube 6 serving as the throttle for the main carburetor. Hence the rotary throttle for the main carburetor is located close to the feeders 1$^e$ or intake valves. This is an important point in the efficient operation of the engine, for if the throttle for the main carburetor were located at a point close to the carburetor, every time the engine was aspirating through the low speed duct 3$^b$ and low speed or auxiliary carburetor C' said operation would tend to rarify the column of gases in the high speed bore 1$^b$ and 1$^c$ and cause lagging thereof owing to the inlet valve turning for high speed. Any gas which might be forced back through the inlet valve would tend to compress this column of gas in the high speed duct, and a state of pulsation would soon be set up which would tend to disturb the distribution of the low speed gas, and make the engine surge. But by locating the throttle close to the feeds or intake ports 1$^e$, this surging or pulsation is entirely eliminated. However, as for the low speed or auxiliary carburetor C', the throttle therefore would be located close to the carburetor where a better control for low speed gases is obtained.

My novel manifold will give maximum efficient gas speeds at and for all engine speeds, and will give two separate and distinct efficiency ranges and peaks.

I claim:

1. For an engine of the character specified, an intake manifold having an inlet adapted to be connected to a main carburetor; a feeder on said manifold adapted to register with the engine intake valve port; a valve in said manifold; an exhaust duct in said manifold for the passage therethrough of the engine exhaust gases and having an inlet and an outlet; a fuel duct heated by the exhaust duct; said fuel duct adapted to be connected to an auxiliary carburetor; a passage connecting the fuel duct with the feeder; and means whereby the valve will be operated to connect the main carburetor with the feeder at a predetermined opening of the auxiliary carburetor valve.

2. For an engine of the character specified, an intake manifold having an inlet adapted to be connected to a main carburetor; a feeder communicating with said manifold and adapted to register with the engine intake valve port; a valve in said manifold; an exhaust duct extending longitudinally of said manifold and adapted for the passage therethrough of the engine exhaust gases and having an inlet and an outlet; a fuel duct within the exhaust duct and having an inlet adapted to be connected with an auxiliary carburetor; a passage connecting said fuel duct with the feeder; means for heating the air passing into the auxiliary carburetor; and means whereby the valve may be operated to connect the main carburetor to the feeder at a predetermined opening of the auxiliary carburetor valve.

3. In a manifold as set forth in claim 2, said exhaust duct outlet being adjacent the fuel duct inlet; and said means for heating the air passing into the auxiliary carburetor, comprising a heater around the exhaust duct outlet, and a pipe leading from said heater into the air intake port of the auxiliary carburetor.

4. For an engine of the character specified; a manifold comprising a tubular body portion having an inlet adapted to be connected with a main carburetor; a feeder communicating with the said body portion and adapted to register with the engine intake port; a sleeve rotatably mounted within said body portion, and having circumferentially disposed slots therein opposite said inlet, and having a slot therein opposite said feeder; an exhaust duct exterior to and extending longitudinally of said body portion and adapted for the passing therethrough of the engine exhaust gases; an auxiliary fuel duct within said exhaust duct; said fuel duct being adapted to be connected with an auxiliary carburetor; a passage connecting said auxiliary fuel duct with the feeder; and means whereby the sleeve may be rotated to connect the main carburetor with the feeder at a predetermined opening of the auxiliary carburetor valve.

5. For an engine of the character specified, an intake manifold comprising a tubular body portion closed at its ends and having an inlet adapted to be connected to a main carburetor; a feeder connecting said body portion with the engine intake port; a sleeve rotatably mounted within said body portion, said sleeve being closed at both ends and having circumferentially disposed slots therein opposite said inlet, and a port opposite said feeder; an exhaust duct extending longitudinally of said body portion, and adapted to receive the exhaust gases from the engine; said exhaust duct having an outlet; a fuel duct of relatively small size within the exhaust duct and adapted to be heated thereby; an inlet for said fuel duct being adapted to be connected with an auxiliary carburetor; a passage connecting said gas duct with the feeder; means for heating the air passing into the auxiliary carburetor; and means whereby the sleeve may be rotated to connect the main carburetor with the feeder after a predetermined opening of the auxiliary carburetor valve.

6. In a manifold as set forth in claim 5, said exhaust duct outlet being adjacent the fuel duct inlet; and said means for heating the air passing into the auxiliary carburetor, comprising a heater around the exhaust duct outlet, and a pipe leading from said heater into the air intake port of the auxiliary carburetor.

7. For an engine of the character specified, a manifold comprising a body portion having an inlet adapted to be attached to a main carburetor; a plurality of feeders communicating with the body portion and adapted to register respectively with the intake valve ports of said engine; an exhaust duct extending longitudinally of said body portion and adapted for the passage therethrough of the engine exhaust gases; a fuel duct heated by the exhaust duct and having an inlet adapted to be attached to an auxiliary carburetor; and passages leading from said fuel duct into the feeders respectively.

8. For an engine of the character specified, a manifold comprising a body portion having an inlet adapted to be attached to a main carburetor; a plurality of feeders communicating with the body portion and adapted to register respectively with the intake valve ports of said engine; an exhaust duct extending longitudinally of said body portion and adapted for the passage therethrough of the engine exhaust gases; a fuel duct heated by the exhaust duct, and having an inlet adapted to be attached to an auxiliary carburetor; passages leading from said fuel duct into the feeders respectively; and a valve in said body portion adapted to be operated to connect the main carburetor to the feeders at a predetermined opening of the auxiliary carburetor valve.

9. For an engine of the character specified, a manifold comprising a body portion having an inlet adapted to be attached to a main carburetor; a plurality of feeders communicating with the body portion and adapted to register respectively with the intake valve ports of said engine; an exhaust duct extending longitudinally of said body portion and adapted for the passage therethrough of the engine exhaust gases, said exhaust duct having an outlet; a fuel duct heated by the exhaust duct and having an inlet adapted to be attached to an auxiliary carburetor; passages leading from said fuel duct into the feeders respectively; a valve in said body portion; and means whereby the valve may be operated to connect the main carburetor with the feeders at a predetermined opening of the auxiliary carburetor valve.

10. In combination with a manifold as set forth in claim 9, said exhaust duct outlet being adjacent the fuel duct inlet; and means for heating the air passing into the auxiliary carburetor comprising a heater around the exhaust duct outlet, and a connection between the heater and the air intake port of the auxiliary carburetor.

In testimony that I claim the foregoing as my own, I affix my signature.

HENRY LOWE BROWNBACK.